United States Patent
Bulsink

(10) Patent No.: US 10,301,116 B2
(45) Date of Patent: May 28, 2019

(54) LINKED CONVEYOR BELT AND METHOD OF MANUFACTURING A LINKED CONVEYOR BELT

(71) Applicant: KAAK GROEP B.V., Terborg (NL)

(72) Inventor: Jan Jacob Bulsink, Terborg (NL)

(73) Assignee: KAAK GROEP B.V., Terborg (NL)

( * ) Notice: Subject to any disclaimer, the term of this patent is extended or adjusted under 35 U.S.C. 154(b) by 0 days.

(21) Appl. No.: 15/554,090

(22) PCT Filed: Feb. 16, 2016

(86) PCT No.: PCT/NL2016/050106
§ 371 (c)(1),
(2) Date: Aug. 28, 2017

(87) PCT Pub. No.: WO2016/137316
PCT Pub. Date: Sep. 1, 2016

(65) Prior Publication Data
US 2018/0037414 A1  Feb. 8, 2018

(30) Foreign Application Priority Data
Feb. 26, 2015 (NL) .................................. 2014355

(51) Int. Cl.
*B65G 17/08* (2006.01)
*B65G 17/40* (2006.01)
(Continued)

(52) U.S. Cl.
CPC ............. *B65G 17/40* (2013.01); *B29D 29/06* (2013.01); *B33Y 10/00* (2014.12); *B33Y 80/00* (2014.12);
(Continued)

(58) Field of Classification Search
CPC ...... B65G 17/08; B65G 17/06; B65G 17/086; B65G 17/22; B65G 17/40
(Continued)

(56) References Cited

U.S. PATENT DOCUMENTS 1,915,939 A * 6/1933 Lund .................... B65G 17/086
  198/850
4,394,901 A   7/1983 Roinestad
(Continued)

FOREIGN PATENT DOCUMENTS

DE   9411204 U1   9/1994
EP   1911694 A1   4/2008
(Continued)

OTHER PUBLICATIONS

International Search Report from PCT Application No. PCT/NL2016/050106, dated Jul. 29, 2016.
(Continued)

*Primary Examiner* — James R Bidwell
(74) *Attorney, Agent, or Firm* — Workman Nydegger

(57) ABSTRACT

A conveyor belt is provided that includes a series of linked elongated support members, which extend transverse to the conveyor belt and are arranged one behind the other in a longitudinal direction of the conveyor belt. The conveyor belt includes a first and a second support member, which are adjacent and partially inserted into each other. The first support member includes a first part and a second support member includes two second parts, wherein the first part is inserted between the two second parts. The first part includes a through-opening that extends transverse to the conveyor belt. At least one of the second parts includes a pin which extends transverse to the conveyor belt, and which is arranged in the through-opening. The pin is integrally formed with the second support member. The adjacent support members have been manufactured in a coupled state, preferably using an additive manufacturing process.

20 Claims, 12 Drawing Sheets

(51) Int. Cl.
*B65G 17/22* (2006.01)
*B33Y 10/00* (2015.01)
*B33Y 80/00* (2015.01)
*B29D 29/06* (2006.01)

(52) U.S. Cl.
CPC ........... *B65G 17/08* (2013.01); *B65G 17/086* (2013.01); *B65G 17/22* (2013.01); *B65G 2201/0202* (2013.01); *B65G 2812/02396* (2013.01)

(58) Field of Classification Search
USPC .................................................. 198/850, 853
See application file for complete search history.

(56) References Cited

U.S. PATENT DOCUMENTS

| | | | | |
|---|---|---|---|---|
| 4,815,270 A * | 3/1989 | Lapeyre | ................ | B65G 17/08 198/853 |
| 6,725,883 B2 * | 4/2004 | Guldenfels | ............ | B65G 17/06 198/850 |
| 6,732,856 B2 * | 5/2004 | Maine, Jr. | .............. | B65G 17/08 198/850 |
| 7,314,132 B2 * | 1/2008 | Layne | .................... | B65G 17/08 198/850 |
| 7,360,644 B1 | 4/2008 | Lucchi et al. | | |
| 2002/0117382 A1 | 8/2002 | Maine, Jr. | | |
| 2003/0059567 A1 | 3/2003 | Cediel et al. | | |
| 2007/0181408 A1 * | 8/2007 | Schoepf | ................ | B65G 17/08 198/850 |
| 2007/0181409 A1 | 8/2007 | Damkjaer | | |

FOREIGN PATENT DOCUMENTS

| | | |
|---|---|---|
| EP | 2212222 A1 | 8/2010 |
| EP | 2297007 A1 | 3/2011 |
| EP | 2646350 A1 | 10/2013 |
| WO | 2009064184 A1 | 5/2009 |

OTHER PUBLICATIONS

Search Report from corresponding Netherlands Application No. NL 2014355, dated Nov. 5, 2015.

\* cited by examiner

LINKED CONVEYOR BELT AND METHOD OF MANUFACTURING A LINKED CONVEYOR BELT

BACKGROUND OF THE INVENTION

The invention relates to a conveyor belt comprising a series of elongated support members for supporting goods to be transported. The support members extend transverse to the conveyor belt and are placed in series one behind the other in the direction of the conveyor belt, wherein two support members that are adjacent in the direction of the conveyor belt are at least partially inserted into each other. The parts that are inserted into each other are provided with a through-opening that extends substantially transverse to the conveyor belt. The through-openings are placed substantially in line for providing an accommodation space for a connecting rod for connecting the adjacent support members to each other. The accommodation space extends substantially transverse to the conveyor belt. The adjacent support members are linked to each other by means of the connecting rod arranged in the accommodation space.

Such a conveyor belt is for instance known from European patent 2.646.350, which describes a linked conveyor belt for use in the food industry. Said conveyor belt among others needs to be easy to clean and therefore often have an open structure. They consist of elongated transversely oriented synthetic support members, having a type of zigzag-shape, which in the direction of the conveyor belt are inserted into each other, and at that location are connected to each other by connecting rods.

It is an object of the present invention to provide a linked conveyor belt or a method for manufacturing such a linked conveyor belt, wherein the support members comprise an alternative means for connecting to each other.

SUMMARY OF THE INVENTION

According to a first aspect, the present invention provides a method for manufacturing a conveyor belt comprising a series of linked elongated support members, which provide a plane for supporting goods to be transported, which support members extend transverse to the conveyor belt and are arranged one behind the other in a longitudinal direction of the conveyor belt, wherein said conveyor belt comprises a first and a second support member, which are arranged adjacent to each other and which are partially inserted into each other, wherein the first support member comprises a first part, wherein the first part comprises a through-opening that extends transverse to the conveyor belt, wherein the second support member comprises two second parts, wherein at least one of said second parts comprises a pin which extends transverse to the conveyor belt, wherein said pin is integrally formed with the second support member, and wherein the first part is inserted between the two second parts and the pin is arranged in the through-opening, wherein the first and second support members are manufactured in a coupled state by means of an additive manufacturing process.

Within this application, the term additive manufacturing process refers to a process of joining materials to make objects from 3D data, usually layer upon layer. Examples of additive manufacturing processes are Powder Bed Fusion, Binder Jetting, Directed Energy Deposition, Material Extrusion, Material Jetting, Sheet lamination, and Vat Photopolymerization.

In an embodiment, the additive manufacturing process comprises a 3D printing process. Within this application, the term 3D printing process refers to a process of fabrication of objects through the deposition or irradiation of a material using a print head, nozzle, or another printer technology. Examples of 3D printing processes are Fused Deposition Modelling, Stereolithography or Selective Laser Sintering/Melting.

On the one hand, the use of an additive manufacturing process, such as a 3D Printing process, allows to integrally form the pin with the second support member and to directly form the pin inside the through opening, thus to manufacture the two adjacent support members in the coupled state. Because in the conveyor belt according to the present invention, one or more connecting pins for interconnecting two adjacent support members are integrally formed with one of said support members and said one or more pins are arranged in a through opening in said other one of said support members, the two adjacent support members are interconnected without the use of an additional part, such as a connecting rod. So, the conveyor belt according to the present invention requires less parts in order to assemble the conveyor belt.

In addition, since the pin is integrally formed with the second support member, the pin can be directly formed in the through-opening by the additive manufacturing process, such as a 3D printing process. This allows to manufacture the support member directly in their coupled state, which provides a quicker and easier production and/or assembly of the conveyor belt of the present invention.

On the other hand, the use of such a 3D Printing process provides a highly adaptive manufacturing process which allows to change the shape and/or design of the support members, to change the width and/or length of the support members, and/or to change the thickness of the support members, by changing the software or computer instructions for driving the 3D Printer. Thus a large variety of conveyor belts can be manufactured using the same 3D Printer.

According to a second aspect, the present invention provides a conveyor belt comprising a series of linked elongated support members, which provide a plane for supporting goods to be transported, which support members extend transverse to the conveyor belt and are arranged one behind the other in a longitudinal direction of the conveyor belt, wherein said conveyor belt comprises a first and a second support member, which are arranged adjacent to each other and which are partially inserted into each other, wherein the first support member comprises a first part, wherein the first part comprises a through-opening that extends transverse to the longitudinal direction of the conveyor belt, wherein the second support member comprises two second parts, wherein at least one of said second parts comprises a pin which extends transverse to the longitudinal direction of the conveyor belt, wherein said pin is integrally formed with the second support member, and wherein the first part is arranged between the two second parts and the pin is arranged in the through-opening.

As described already with respect to the method of the invention, one or more connecting pins for interconnecting two adjacent support members according to the invention are integrally formed with one of said support members, and said one or more pins are arranged in a through opening in said other one of said support members. Thus the two adjacent support members are interconnected without the use of an additional part, such as a connecting rod. So, the conveyor belt according to the present invention requires less parts in order to assemble the conveyor belt.

In addition, the pin is preferably enclosed by the first part of the first support member. Accordingly, the pin is substantially locked or retained in the first part of the first support member, which provides a substantial permanent coupling between the first support member an d the second support member. Preferably the permanent coupling is established during an additive manufacturing process for producing said conveyor belt.

In an embodiment, the first and second support members have been manufactured in a coupled state, preferably by means of an additive manufacturing process, preferably a 3D printing process. Since the pin is integrally formed with the second support member, the pin can be directly formed in the through-opening using an additive manufacturing process, such as a 3D printing process. This allows to manufacture the support members directly in their coupled state, which provides a quicker and easier production and/or assembly of the conveyor belt of the present invention.

In an embodiment, the pin is arranged to connect to said two second parts of the second one of said two adjacent support members, and to reach through the through-opening of the first one of said two adjacent support members. Thus the pin bridges the distance between the two second parts and interconnects the two second parts. In an embodiment, the pin is integrally formed with both second parts of the second support member.

In an embodiment, each of said second parts comprises a pin which extends substantially transverse to the conveyor belt, wherein the pins are integrally formed with the second one of said two adjacent support members, and are arranged in the through opening of the first one of said two adjacent support members. In this embodiment, a pin reaches into the through opening from both second parts. Thus, on both sides of the through opening in the first part, a pin extends from each of said second parts into the through opening, which provides a better connection between the adjacent support members.

In one embodiment, the pins are arranged at a distance from each other. Thus, the pins are not connected and there is a gap between the two pins. Preferably this gap is arranged inside the through opening of the first part of the first support member.

In an embodiment, the first and second support members are substantially rigid, at least in a direction in substantially parallel to said plane for supporting goods to be transported. Using substantially rigid support members are preferable in the conveyor belt of the invention in order to carry the goods to be transported, without the additional strength provided by the connecting rods between each two adjacent support members as in the prior art. It is noted that alternatively or in addition to the use of substantially rigid support members, the conveyor belt of the invention may also be arranged on a support construction which proves more support for the conveyor belt in order to carry the goods to be transported.

In an embodiment, at least in a direction transverse to the longitudinal direction of the conveyor belt, a width of the first part is substantially equal to a distance between the two second parts. In this embodiment, the first part substantially fills the space between the two second parts, which effectively prevents that the pin may slip out of the through opening.

In an embodiment, the trough-opening in the first part comprises a slotted hole. In an embodiment, the slotted hole provides a slot in a direction substantially parallel to the direction of the conveyor belt. This allows to move said conveyor belt through a bend in a plane substantially parallel to said plane for supporting goods to be transported. Such conveyor belts are for example used in a helical conveyor as for example described in WO 2009/064184.

In an embodiment, the pin comprises a substantially circular cross section, at least in a direction substantially transverse to the elongated support members. This allows the support members to be rotatable around said pin, and to arranged the conveyor belt in an endless loop around said two rotatable drums. The two rotatable drums are arranged inside the endless loop and serve as a return drum or end drum of said conveyor belt. Such a conveyor belt is in particular suitable for use in a belt conveyor system having an upper course for transporting goods, and a lower or return course for returning the conveyor belt from the end side to the front side of the belt conveyor system.

In an alternative embodiment, the through-opening and the pin comprises a substantially rectangular cross section, at least in a direction substantially transverse to the elongated support members. This essentially prevents the support members to rotate around said pin. Such a conveyor belt is in particular suitable for use in a belt conveyor system where the conveyor belt is arranged to move around in substantially one plane, and with no lower or return course. The use of elongated support members having a through-opening and a pin with a substantially rectangular cross section, can substantially prevent a tipping up of the conveyor belt out of the plane of the belt conveyor system.

In an embodiment, the first support member comprises at least two first parts which are arranged at a distance from each other in a directions transverse to the longitudinal direction of the conveyor, wherein each one of said first parts comprises a through-opening that extends transverse to the longitudinal direction of the conveyor belt, wherein the second support member comprises at least three second parts which are arranged at a distance from each other in the directions transverse to the longitudinal direction of the conveyor, wherein said second parts comprises at least two pins which extend transverse to the longitudinal direction of the conveyor belt, each one of said two pins is arranged to extend in a space between two second parts, wherein said pins are integrally formed with the second support member, and wherein each one of said first parts is arranged between the two second parts and each one of said pins is arranged in the through-opening of one of the first parts. In an embodiment, the through-openings of said at least two first parts are arranged substantially in line, and wherein the at least two pins are arranged substantially in line.

According to a third aspect, the present invention provides a belt conveyor system comprising at least two rotatable drums which are arranged at a distance from each other, and an endless loop of a conveyor belt as described above, wherein the endless loop is arranged around said two rotatable drums. Thus the two rotatable drums are arranged inside the endless loop, and serve as a return drum or end drum of said belt conveyor system.

According to a fourth aspect, the present invention provides a conveyor belt comprising a series of elongated support members for supporting goods to be transported, which support members extend transverse to the conveyor belt and are placed in series one behind the other in the direction of the conveyor belt, wherein two support members that are adjacent in the direction of the conveyor belt are at least partially inserted into each other, wherein the parts that are inserted into each other are provided with a through-opening that extends substantially transverse to the conveyor belt and wherein the through-openings are placed substantially in line for providing an accommodation space for a connecting rod for connecting the adjacent support members to each other, which accommodation space extends substantially transverse to the conveyor belt, wherein at least one of the trough-openings and the connecting rod comprises a substantially rectangular cross section, at least in a direction substantially transverse to the elongated support members.

According to a fifth aspect, the present invention provides a use of a conveyor belt or an embodiment as described above, for transporting goods.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
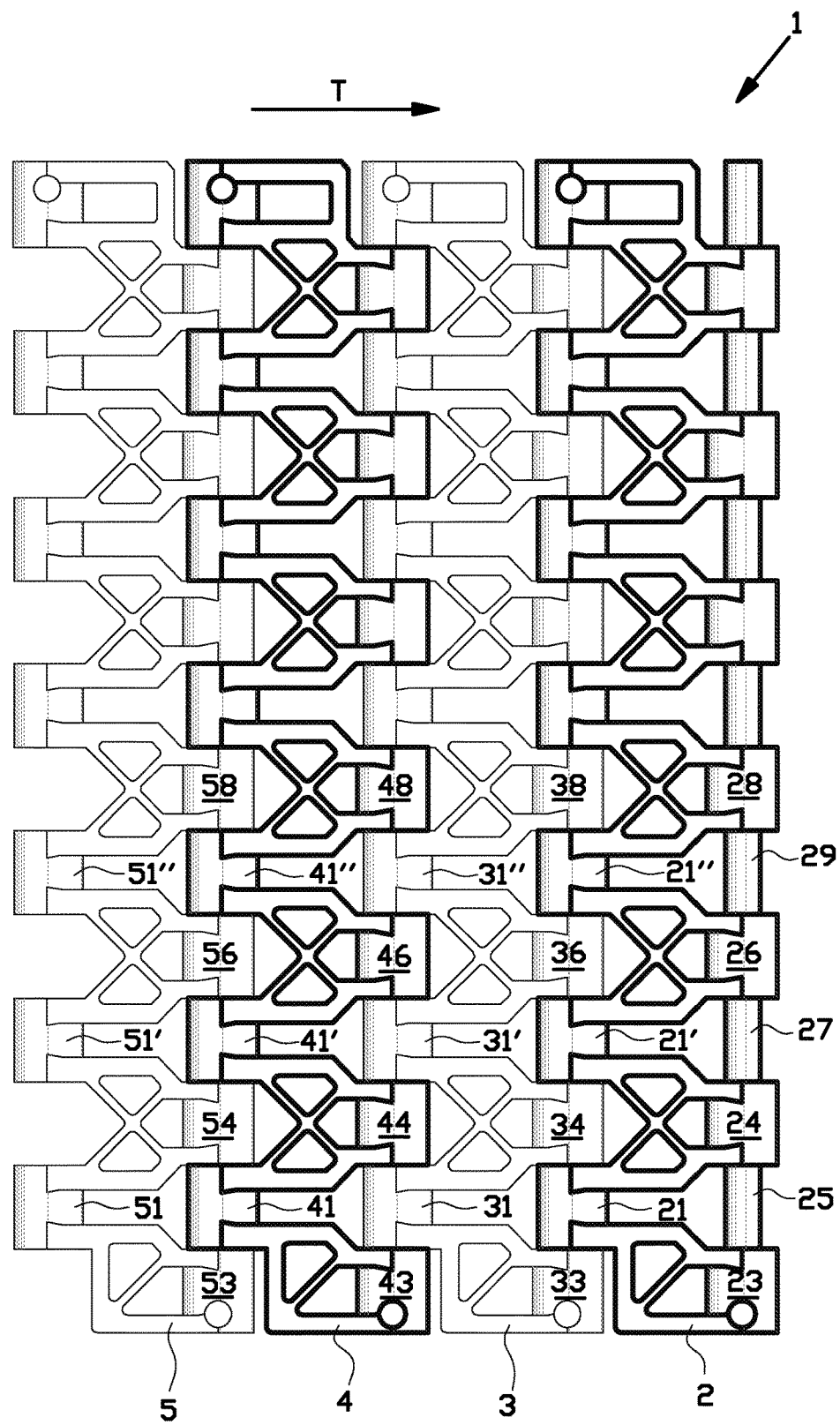
FIG. 1 schematically shows a top view of a part of a conveyor belt of the invention according to a first example.
Figure 2:
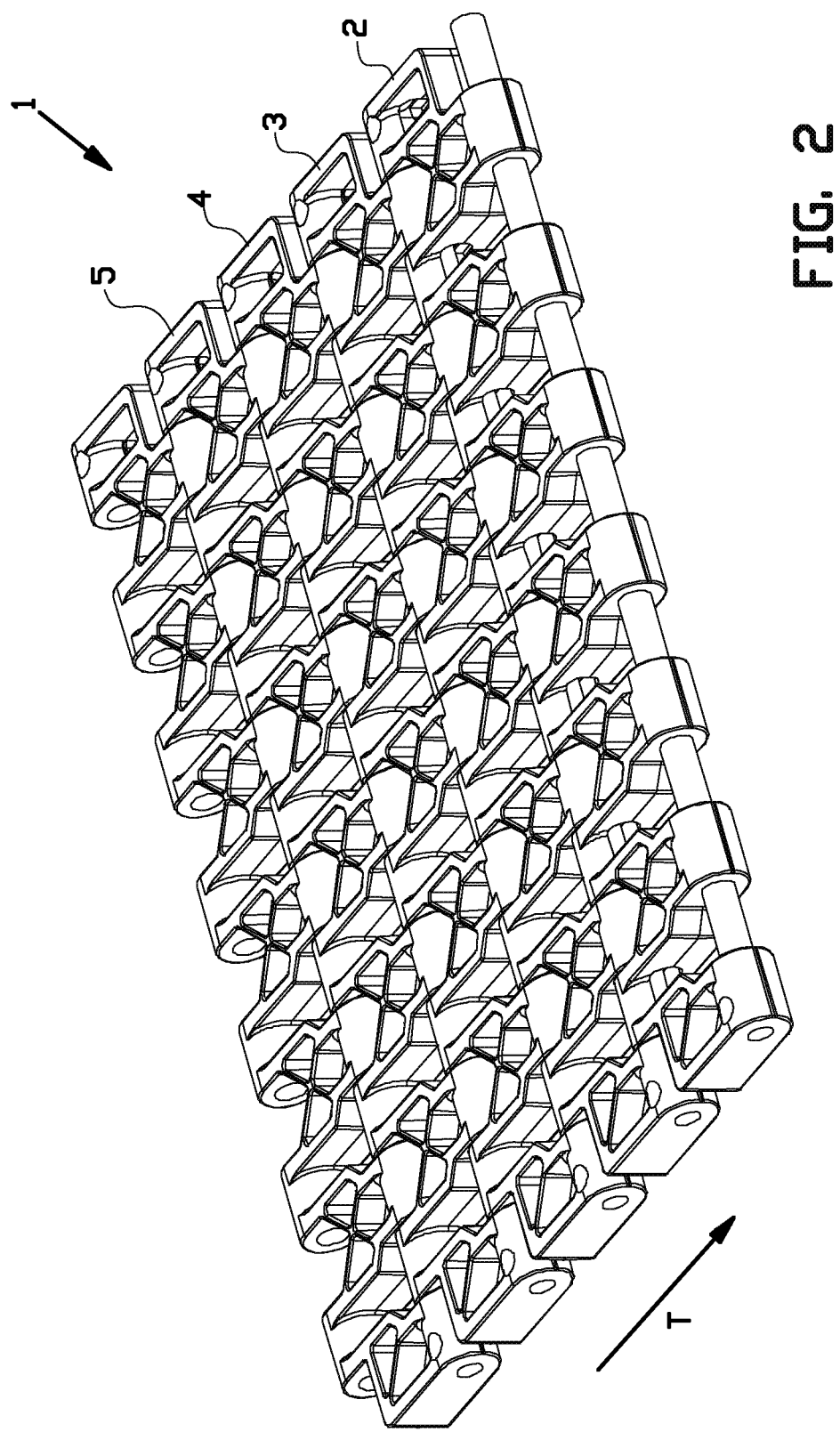
FIG. 2 schematically shows a three-dimensional view of the part of the example of FIG. 1.

FIGS. 1 and 2 schematically show a part of a conveyor belt 1 of the invention according to a first example, which conveyor belt 1 comprises a series of elongated support members 2, 3, 4, 5 which provide a plane for supporting goods to be transported in a transport direction T. The support members 2, 3, 4, 5 extend substantially transverse to the transport direction T and are placed in series one behind the other in said transport direction T of the conveyor belt 1. As schematically shown in FIGS. 1 and 2, two adjacent support members 2,3; 3,4; 4,5 are at least partially inserted into each other.

Figure 3:
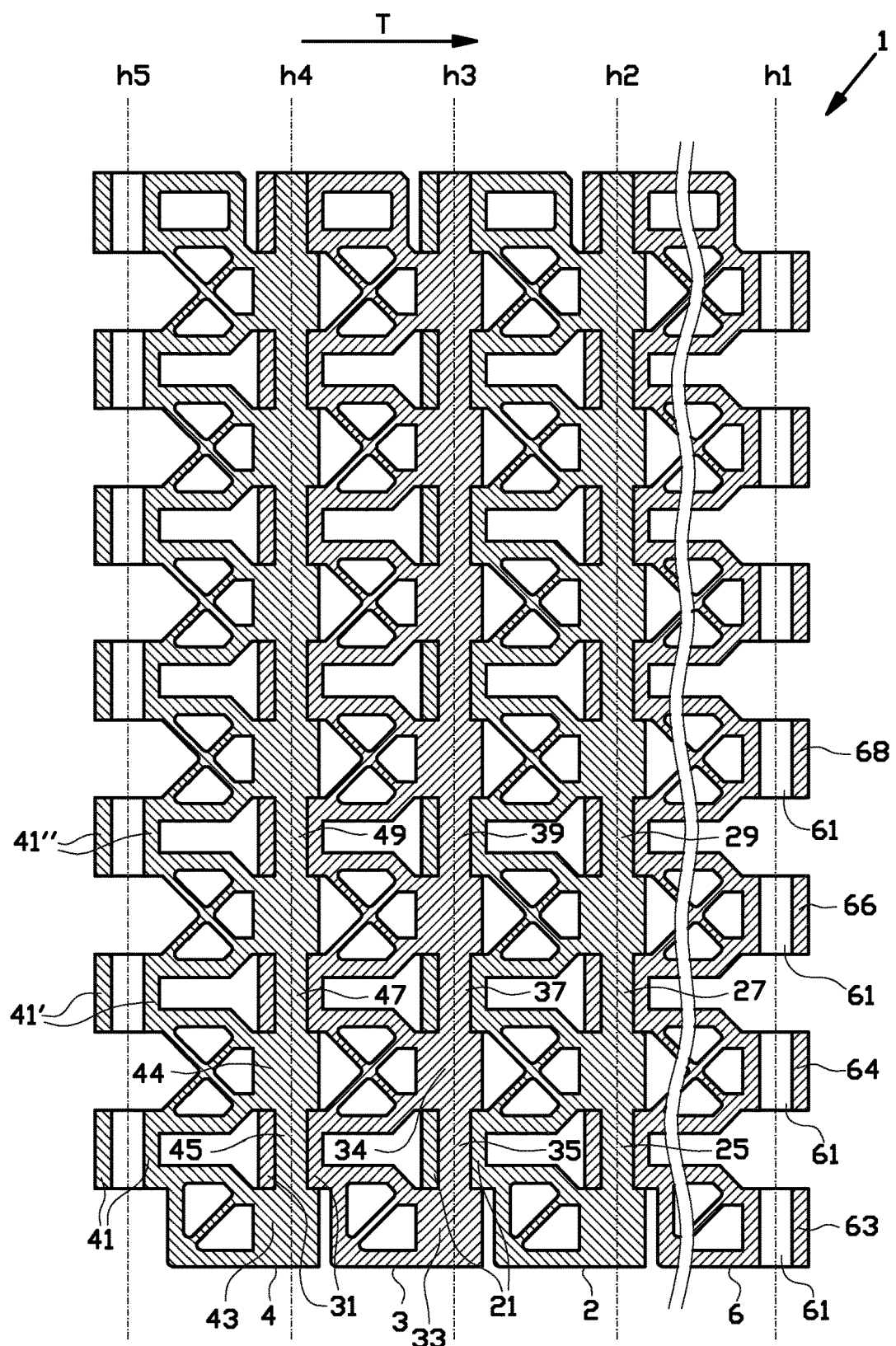
FIG. 3 schematically shows a cross section of the part of the example of FIG. 1.

As shown in FIG. 1 and in more detail in the cross section in FIG. 3, a first one 2, 3, 4 of said two adjacent support members 2,3; 3,4; 4,5 comprises at least a first part 21, 31, 41, wherein the first part 21, 31, 41 comprises a through-opening 22, 32, 42 that extends substantially transverse to the transport direction T of the conveyor belt 1. A second one 3, 4, 5 of said two adjacent support members comprises at least two second parts 33,34; 43,44; 53,54 wherein the first part 21, 31, 41 is inserted between the two second parts 33,34; 43,44; 53,54. At least one of said second parts 33,34; 43,44; 53,54 comprises a pin 35, 45 which extends substantially transverse to the transport direction T of the conveyor belt 1, wherein the pin 35, 45 is integrally formed with the second one 3, 4, 5 of said two adjacent support members 2,3; 3,4; 4,5, and is arranged in the through opening 22, 32, 42 of the first one 2, 3, 4 of said two adjacent support members 2,3; 3,4; 4,5.

In this first example, each support member 2, 3, 4, 5 comprises on a first side which extends substantially perpendicular to the transport direction T, a series of first parts 21, 21', 21", . . . ; 31, 31', 31", . . . ; 41, 41', 41", . . . ; 51, 51', 51", . . . and on a second side which extends substantially perpendicular to the transport direction T and opposite to said first side, a series of second parts 23, 24, 26, 28, . . . ; 33, 34, 36, 38, . . . ; 43, 44, 46, 48, . . . ; 53, 54, 56, 58, . . ., which are interconnected by a series of pins 25, 27, 29, . . . ; 35, 37, 39, . . . ; 45, 47, 49, . . . . The pins 25, 27, 29, . . . ; 35, 37, 39, . . . ; 45, 47, 49, . . . are arranged to connect to two adjacent second parts and are integrally formed with both second parts of said series of second parts 23, 24, 26, 28, . . . ; 33, 34, 36, 38, . . . ; 43, 44, 46, 48, . . . ; 53, 54, 56, 58, . . . . As schematically shown in the cross section of FIG. 3, the pins of each series of pins 25, 27, 29, . . . ; 35, 37, 39, . . . ; 45, 47, 49, . . . are arranged on a series centre line h2, h3, h4 which extends substantially perpendicular to the transport direction T. In addition the through openings in the first parts of each series of first parts 21, 21', 21", . . . ; 31, 31', 31", . . . ; 41, 41', 41", . . . ; 51, 51', 51", . . . are arranged on a series centre line h3, h4, h5 which extends substantially perpendicular to the transport direction T. The pins of each series of pins 35, 37, 39, . . . ; 45, 47, 49, . . . are rotatable arranged in the through openings in the first parts of each series of first parts 21, 21', 21", . . . ; 31, 31', 31", . . ., in particular rotatable around the corresponding series centre line h2, h3. This allows arranged the conveyor belt 1 around a pulley or drum of a belt conveyor system. Such a belt conveyor system comprises two or more of said pulleys of drums, with an endless loop of the conveyor belt 1 that rotates around them.

In order to arrange the conveyor belt 1 in an endless loop, a support members 6 at a first end of the conveyor belt 1 comprises a series of second parts 63, 64, 66, 68, . . . which comprises a series of through openings 61, which are arranged on a series centre line h1, as shown in FIG. 3. In order to provide an endless loop, the series of through openings 61 in the series of second parts 63, 64, 66, 68 . . . of a first or last support member 6 are arranged in line with the series of through openings of a series of first parts 41, 41', 41", . . . of a support member 4 at a second end of the conveyor belt 1, opposite to the first end of the conveyor belt 1. In this position, both series of through openings are placed substantially in line for providing an accommodation space for a connecting rod for connecting the support member of the first end to the support member of the second end.

Figure 4:
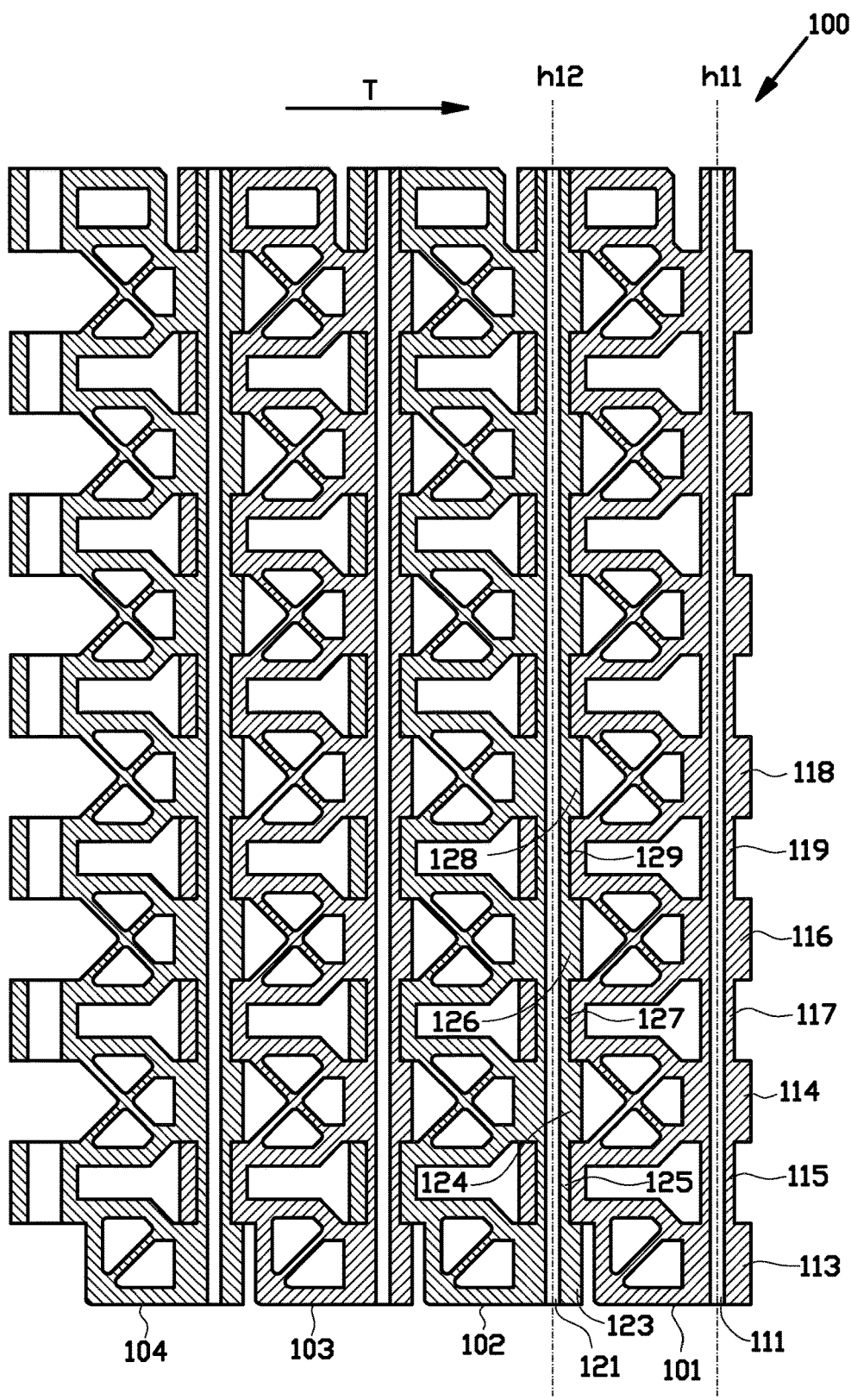
FIG. 4 schematically shows a cross section of a part of a conveyor belt according to a second example.

FIG. 4 schematically shows a cross section of a part of a conveyor belt 100 according to a second example, which conveyor belt 100 comprises a series of elongated support members 101, 102, 103, 104 which provide a plane for supporting goods to be transported in a transport direction T. Just as in the previous example, the support members 101, 102, 103, 104 extend substantially transverse to the transport direction T and are placed in series one behind the other in said transport direction T of the conveyor belt 100. Contrarily to the first example as described above, the series of second parts 113, 114, 116, 118, . . . 123, 124, 126, 128, . . . and the series of pins 115, 117, 119, . . . ; 125, 127, 129, . . . are interconnected and are provided by a through opening 111, 121 which extends along a corresponding series centre line h11, h12. The use of support members 101, 102, 103, 104 having such a series of hollow second parts 113, 114, 116, 118, . . . 123, 124, 126, 128, . . . and a series of hollow pins 115, 117, 119, . . . ; 125, 127, 129, . . . provides a weight reduction of the support members 101, 102, 103, 104 for use in a light weight conveyor belt 100.

Figure 5:
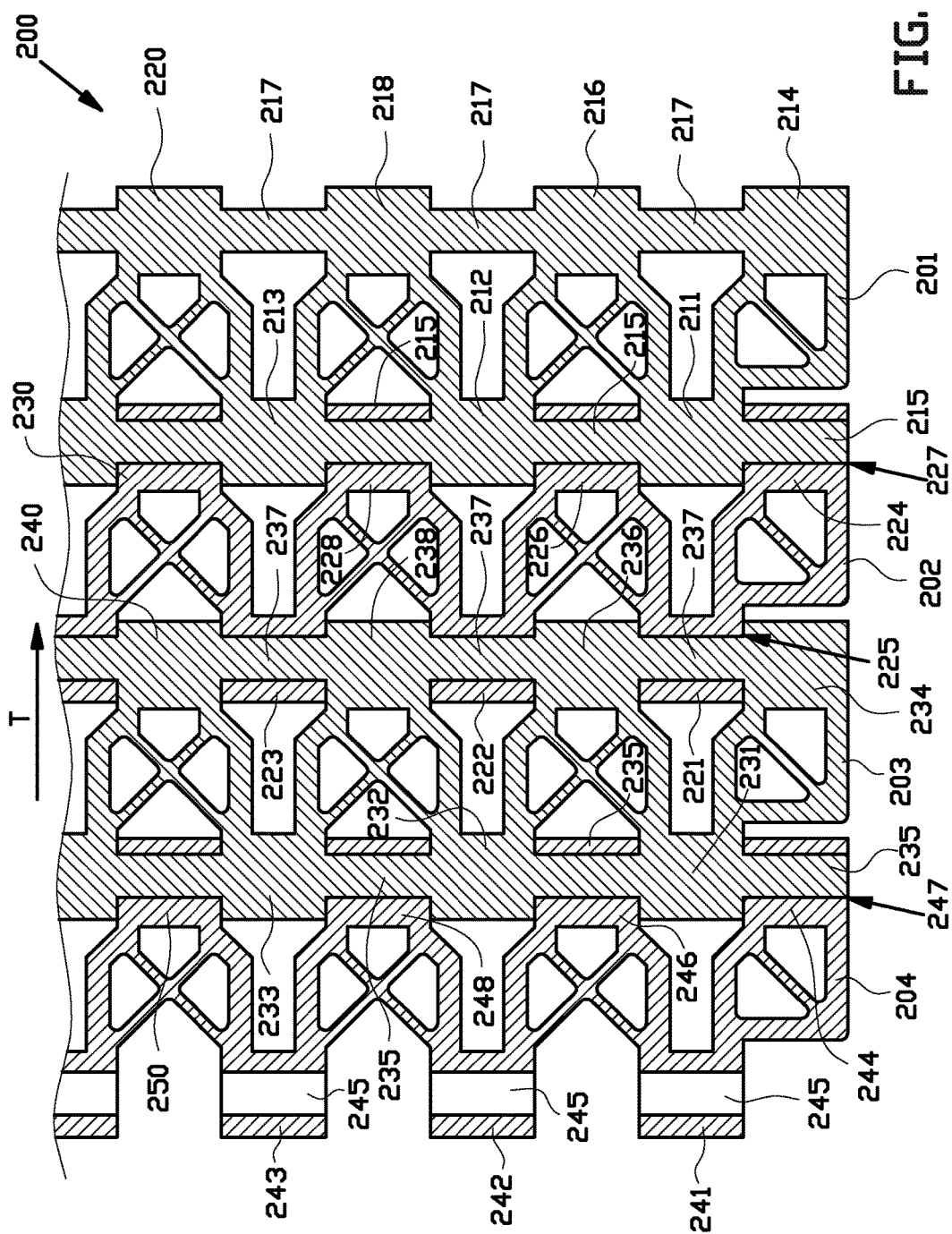
FIG. 5 schematically shows a cross section of a part of a conveyor belt according to a third example.

FIG. 5 schematically shows a cross section of a part of a conveyor belt 200 according to a third example, which conveyor belt 200 comprises a series of elongated support members 201, 202, 203, 204 which provide a plane for supporting goods to be transported in a transport direction T. Just as in the previous example, the support members 201, 202, 203, 204 extend substantially transverse to the transport direction T and are placed in series one behind the other in said transport direction T of the conveyor belt 200. Contrarily to the first and second example as described above, were the conveyor belts 1, 100 comprises a series of support members 2, 3, 4, 5; 101, 102, 103, 104 which are substantially of the same shape and dimensions, whereas the conveyor belt 200 of this third example comprises of support members of different shape, in particular support members of two different types.

The support members 201, 203 of a first kind comprises a series of first parts 211, 212, 213, . . . ; 231, 232, 233, . . . and a series of second parts 214, 216, 218, 220, . . . ; 234, 236, 238, 240, . . . , wherein both series comprises a series of pins 215, 217; 235, 237.

The support members 202, 204 of a second kind comprises a series of first parts 221, 222, 223, . . . ; 241, 242, 243, . . . and a series of second parts 224, 226, 228, 230, . . . ; 244, 246, 248, 250, . . . , wherein both series comprises a series of through openings 225, 227; 245, 247.

In the conveyor belt 200 according to this third example, the support members 201, 203 of the first kind and the support members 202, 204 of the second kind are alternatingly arranged to provide a series of elongated support members 201, 202, 203, 204 which are placed in series one behind the other in said transport direction T of the conveyor belt 200. An advantage of the conveyor belt 200 according to this third embodiment is, that in case the support member at a first end of the conveyor belt 200 and the support member at a second end of the conveyor belt 200, opposite to the first end of the conveyor belt 1, are both support members of the second kind, both the first parts at the first end and the second parts at the second end are provided with through openings. In order to arrange the conveyor belt 200 in an endless loop, the first parts at the first end and the second parts of the second end are placed substantially in line for providing an accommodation space for a connecting rod for connecting the support member of the first end to the support member of the second end.

Apart of having support members of a different shape as described in the third example above, a conveyor belt according to the invention can also comprise support members comprising different materials in order to locally provide desired properties with respect to friction, magnetic properties, wear resistance and/or tensile strength, for example.

Figure 6A:
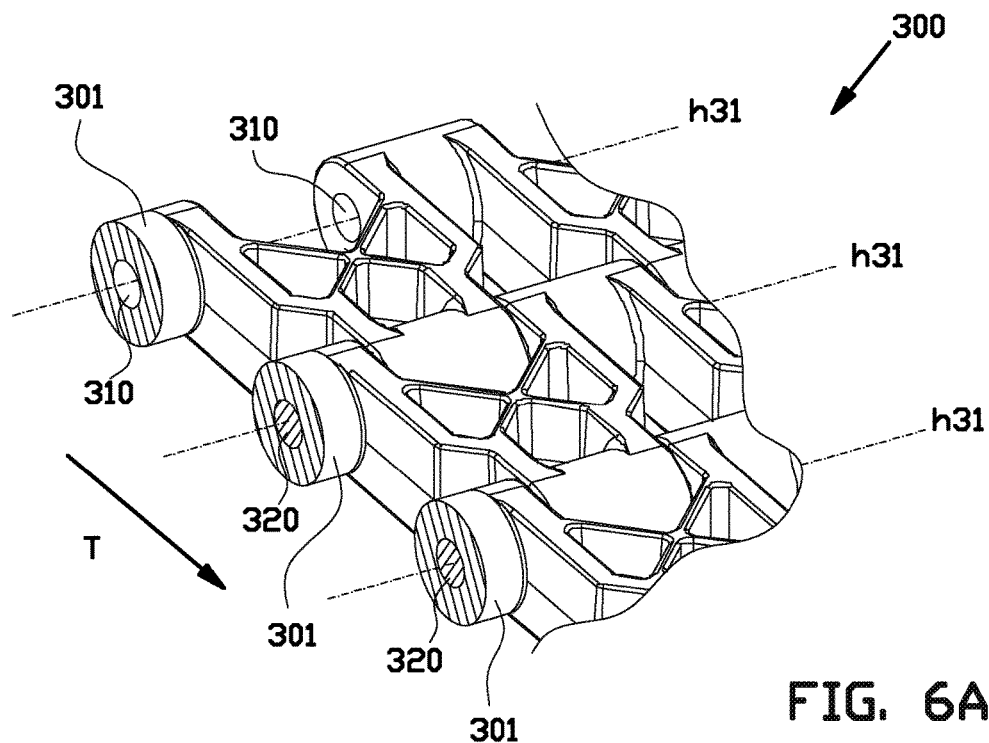
FIG. 6A schematically shows a part of a conveyor belt according to the invention wherein the through opening has a substantial circular cross section.
Figure 6B:
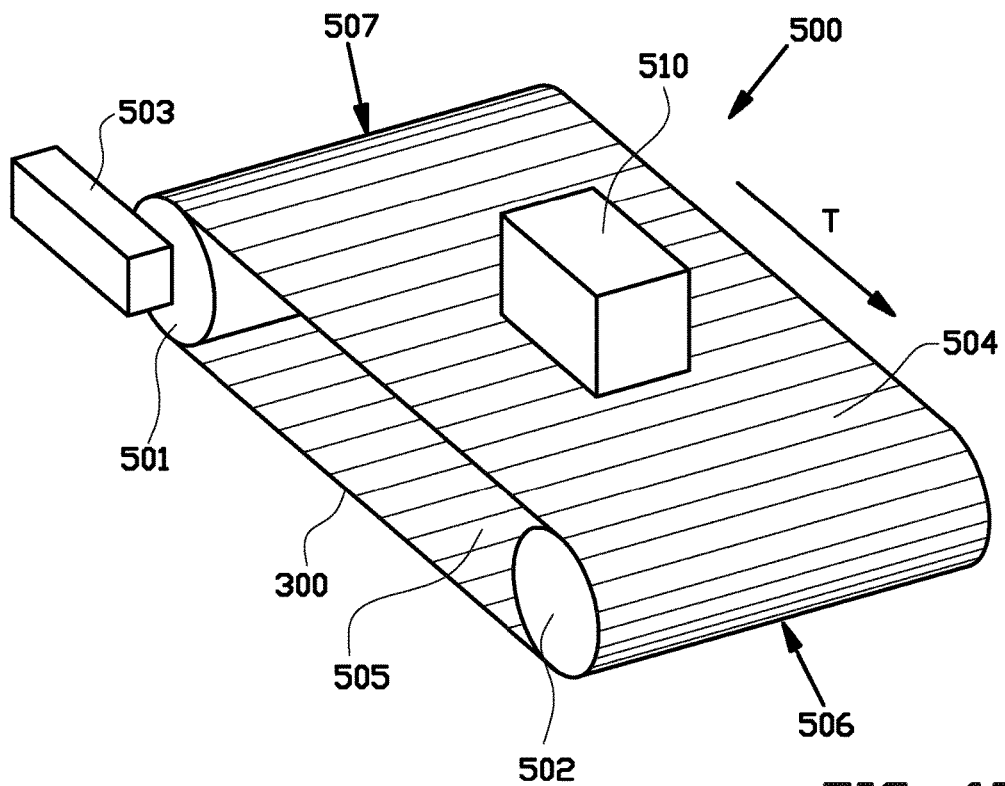
FIG. 6B schematically shows an example of a straight belt conveyor system.

When using any one of the previous examples of a conveyor belt in a substantially straight belt conveyor 300, as schematically shown in FIG. 6B, the through openings 310 and the pins 320 can be of a substantially circular cylindrical shape, with the centre line h31 of said circular cylindrical shaped through openings 310 and pins 320 substantially perpendicular to the transport direction T. An example of part of such a conveyor belt 300 is schematically shown in FIG. 6A. As schematically indicated in FIG. 6A, the pins 320 are enclosed by the first parts 301 of the support members.

The substantially straight belt conveyor system 500 as shown in FIG. 6B, comprises two rotatable drums 501, 502 which are arranged at a distance from each other, and an endless loop of a conveyor belt 300, wherein the endless loop is arranged around said two rotatable drums 501, 502. Thus the two rotatable drums 501, 502 are arranged inside the endless loop, and serve as a return drum or end drum of said belt conveyor system 500. The belt conveyor system 500 comprises an upper course 504 for transporting goods 510, and a lower or return course 505 for returning the conveyor belt 300 from the end side 506 to the front side 507 of the belt conveyor system 500. In the example shown in FIG. 6B, one of said rotatable drums 501 is provided with a motor 503 for driving a rotation of said drum 501 for driving the conveyor belt 300 in transport direction T. Preferably, the support members of said conveyor belt 300 are substantially rigid for supporting goods 510 to be transported on said conveyor belt 300.

Figure 7A:
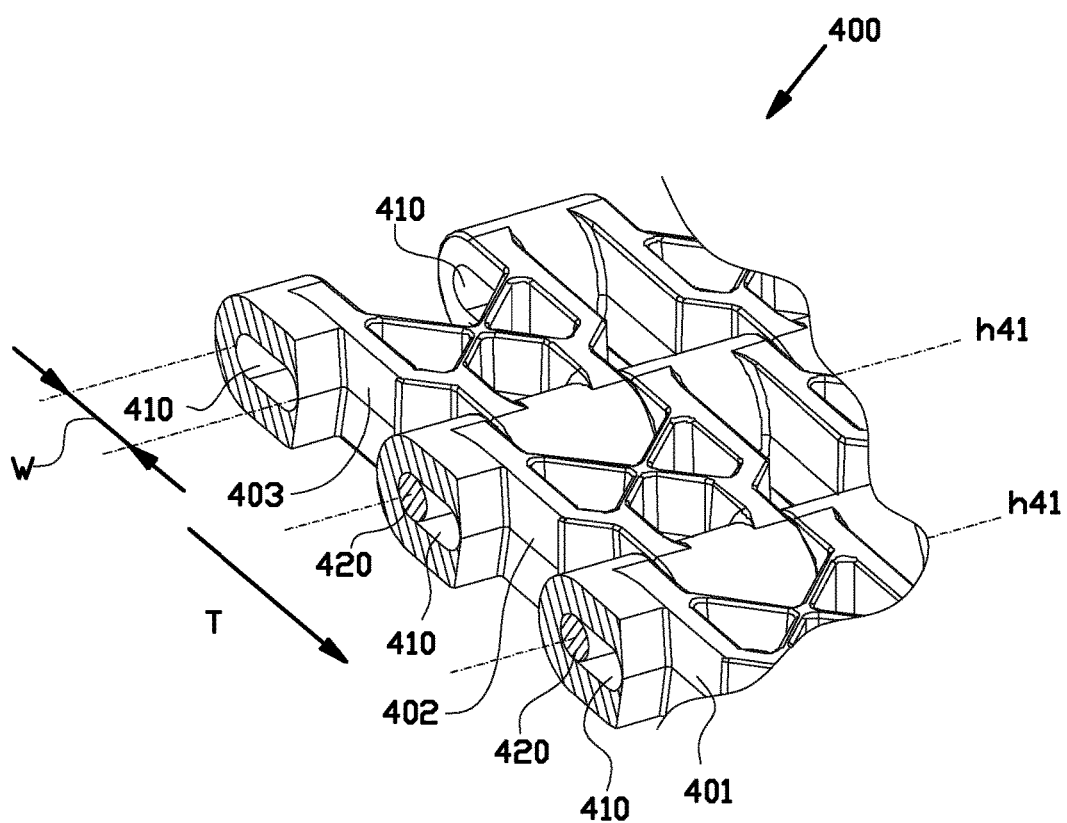
FIG. 7A schematically shows a part of a conveyor belt according to the invention wherein the through opening has a slotted cross section.
Figure 7B:
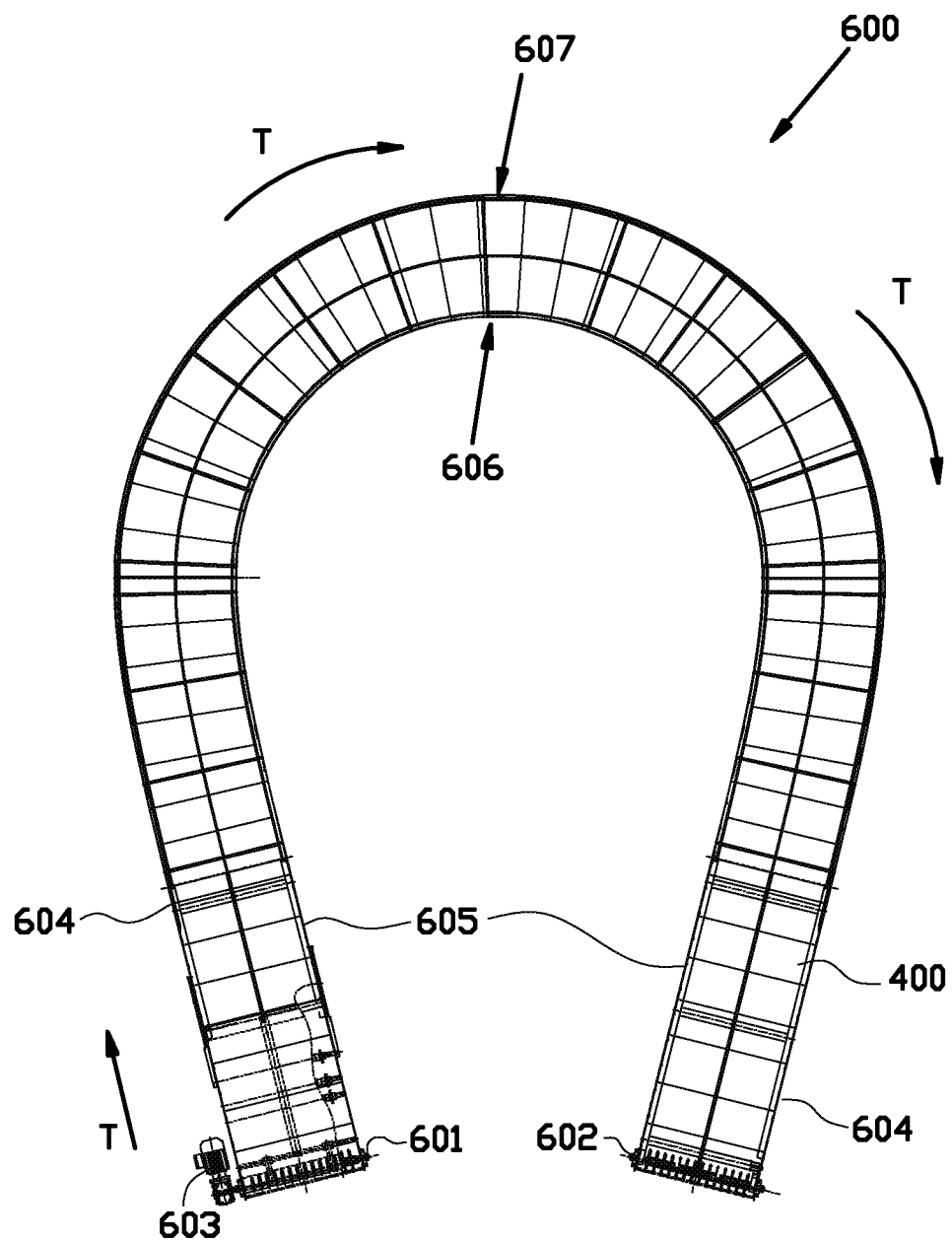
FIG. 7B schematically shows an example of a curved belt conveyor system.

When using any one of the previous examples of a conveyor belt in a curved belt conveyor 400, in particular a belt conveyor wherein the conveyor belt is curved in the plane for supporting goods to be transported, as schematically shown in the top view of FIG. 7B, the pins 420 can be of a substantially circular cylindrical shape, with the centre line h41 of said circular cylindrical shaped pins 420 substantially perpendicular to the transport direction T. However, the through openings 410 have a slotted cross section as schematically shown the example of part of such a conveyor belt 400 is schematically shown in FIG. 7A. As schematically shown, the slots 410 having a width W, and extend in a direction substantially parallel to the direction of the conveyor belt, also described herein as the transport direction T.

The curved belt conveyor system 600 as shown in FIG. 7B, comprises two rotatable drums 601, 602 which are arranged at a distance from each other, and an endless loop of a conveyor belt 400, wherein the endless loop is arranged around said two rotatable drums 601, 602. Thus the two rotatable drums 601, 602 serve as a return drum or end drum of said belt conveyor system 600. In the example shown in FIG. 7B, one of said rotatable drums 601 is provided with a motor 603 for driving a rotation of said drum 601 for driving the conveyor belt 400 in transport direction T.

The conveyor system 600 comprises a frame for supporting the conveyor belt 400, which frame is provided with lateral guides 604, 605 which are arranged at both sides of the conveyor belt 400 for guiding the conveyor belt 400 at least through the curved part of the belt conveyor system 600. Due to the through openings 410 having a slotted shape, the support members 401, 402, 403 can slide close together at the inner side 606 of the curve and/or can slide apart at the outer side 607 of the curve over a distance defined by the width w of the slotted through openings 410 and the diameter of the pins 420.

Figure 8A:
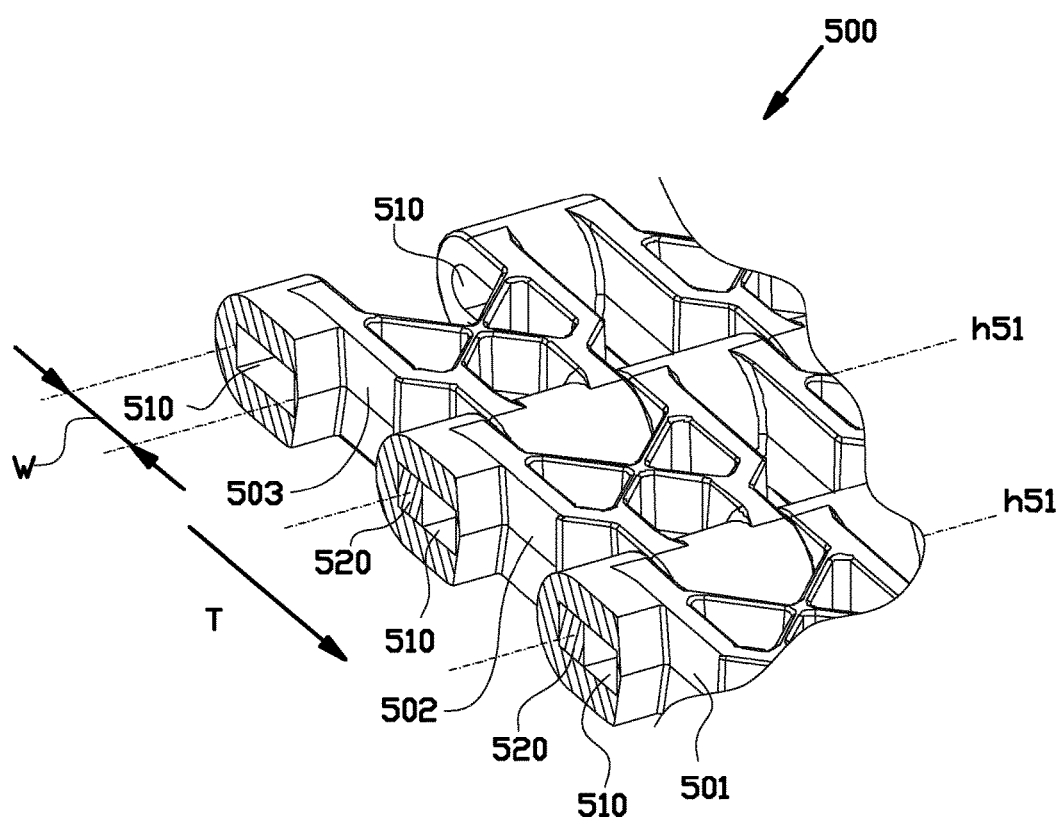
FIG. 8A schematically shows a part of a conveyor belt according to the invention comprising substantially rectangular pins and slotted through openings.

FIG. 8A shows an example of a conveyor belt 500 comprising a series of elongated support members 501, 502, 503 for supporting goods to be transported, which support members extend transverse to the conveyor belt and are placed in series one behind the other in a transport direction T or longitudinal direction of the conveyor belt 500. Two support members 501, 502; 502, 503 that are adjacent in the longitudinal of the conveyor belt are at least partially inserted into each other. As in the previous examples, a first one of said adjacent support members comprises a first part having a through-opening 510 that extends transverse to the longitudinal direction T of the conveyor belt, and a second one of said adjacent support members comprises two second parts, wherein at least one of said second parts comprises a pin 520 which extends transverse to the longitudinal direction of the conveyor belt, wherein said pin 520 is integrally formed with the second one of said adjacent support members. The first part is arranged between the two second parts and the pin 520 is arranged in the through-opening 510.

In an alternative example of a conveyor belt 500 as shown in FIG. 8A, the parts that are inserted into each other are provided with a through-opening 510 that extends substantially transverse to the conveyor belt, wherein the through-openings 510 are placed substantially in line for providing an accommodation space for a connecting rod 520 for connecting the adjacent support members 501, 502, 503 to each other. The accommodation space 510 extends substantially transverse to the conveyor belt 500, and the trough-openings 510 and the connecting rod 520 comprises a substantially rectangular cross section, at least in a direction substantially transverse to the elongated support members 501, 502, 503. In this alternative example, the connecting rod 520 is not integrally formed with the support members.

Figure 8B:
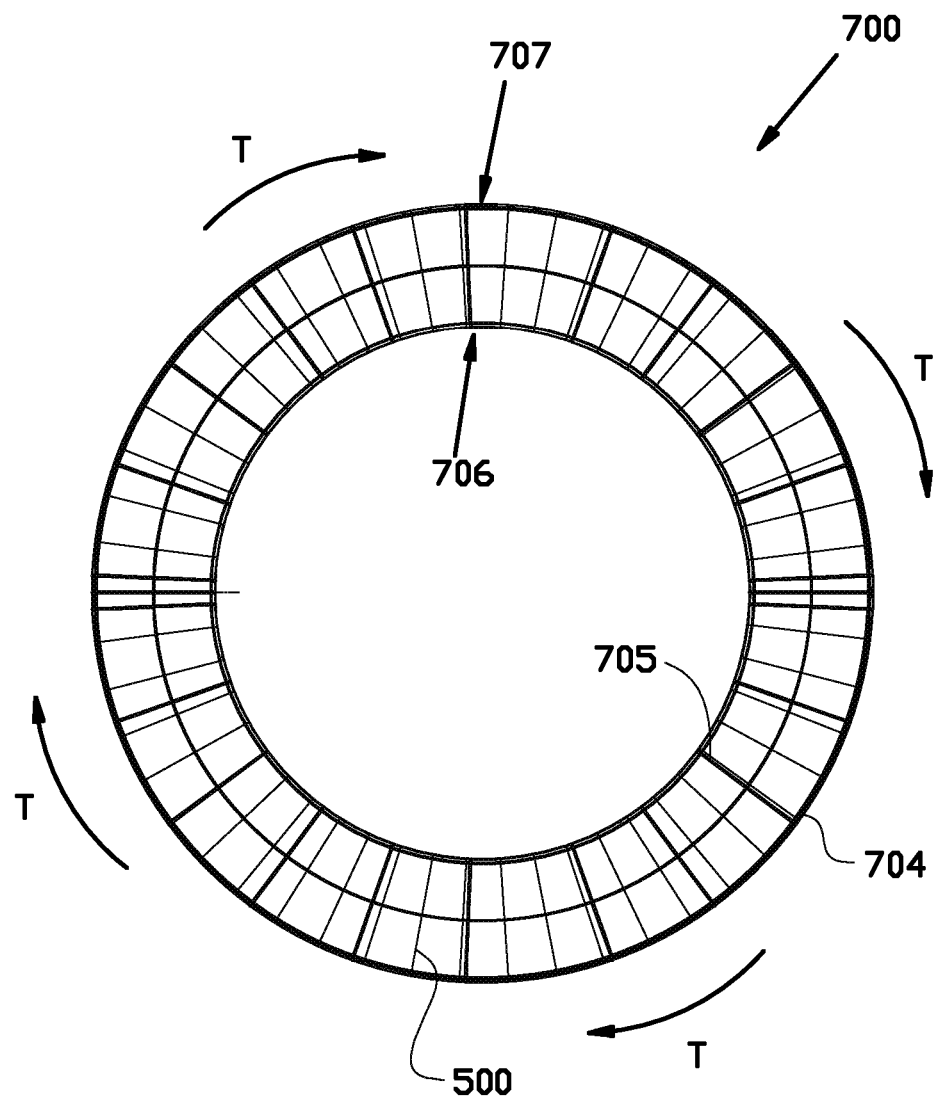
FIG. 8B schematically shows an example of a curved belt conveyor system.

Both examples of the conveyor belt 500 as shown in FIG. 8A, are in particular suitable for use in a curved belt conveyor system 700, in particular a belt conveyor system 700 wherein the conveyor belt 500 is curved in the plane for supporting goods to be transported, as schematically shown in the top view of FIG. 8B. in order to substantially prevent a tilting of the conveyor belt 500 out of the plane of the belt conveyor system 700, the connecting rods 520 have a substantially rectangular cross section with a longitudinal direction h51 of said connecting rods 520 arranged substantially perpendicular to the transport direction T. The through openings 510 have a slotted rectangular cross section as schematically shown the example of part of such a conveyor belt 500 as schematically shown in FIG. 8A. As schematically shown, the slots 510 having a width W, and extend in a direction substantially parallel to the direction of the conveyor belt, also described herein as the transport direction T. The substantially rectangular through-opening 510 and the pin or rod 520 essentially prevents the support members 501, 502, 503 to rotate around said pin or rod 520.

The curved belt conveyor system 700, as shown in FIG. 8B, comprises a frame for supporting the conveyor belt 500, which frame is provided with lateral guides 704, 705 which are arranged at both sides of the conveyor belt 500 for guiding the conveyor belt 500 at least through the curved part of the belt conveyor system 700. Because the through openings 510 having a slotted shape, the support members 501, 502, 503 can slide close together at the inner side 706 of the curve and/or can slide apart at the outer side 707 of the curve over a distance defined by the width w of the slotted through openings 510 and the diameter of the pins 520. In this example, the belt conveyor 500 is arranged to move around in substantially one plane of the belt conveyor system 700. In particular, there is no lower or return course in this belt conveyor system 700. In the example shown in FIG. 8B, the belt conveyor system 700 comprises a closed loop comprising a substantially circular course for transporting goods. Other shapes of a closed loop are also feasible, including closed loop where a part of the course of the conveyor belt passes over another part of the course, such as in a helical conveyor. The belt conveyor system 700 is provided with a driving means for pushing or pulling the conveyor belt 500 along the frame for supporting the conveyor belt 500. The driving means can be provide underneath the conveyor belt 500 or at a side of said conveyor belt 500. Such driving means are known per se, as for example described in European Patent Applications 2.212.222 and 2.297.007 of the applicant.

The use of elongated support members 501, 502, 503 having a through-opening 510 and a pin or a rod 520 with a substantially rectangular cross section, can substantially prevent a tipping up of the conveyor belt 500 out of the plane of the belt conveyor system 700.

In the examples described above, and as shown in FIG. 9, each support member 800 comprises on a first side, a series of first parts 801 which are provided with through openings for accommodating the pins of an adjacent further support member. The through openings are arranged to substantially share the same centre line h81. In addition, each support member 800 comprises on a second side opposite to said first side, a series of second parts 802, which are interconnected by a series of pins 803. The pins 803 are arranged to substantially share the same centre line h82. The pins 803 are arranged to connect to two adjacent second parts 802 and are integrally formed with the support member 800, in particular with both adjacent second parts 802 of the support member 800.

Figure 10:
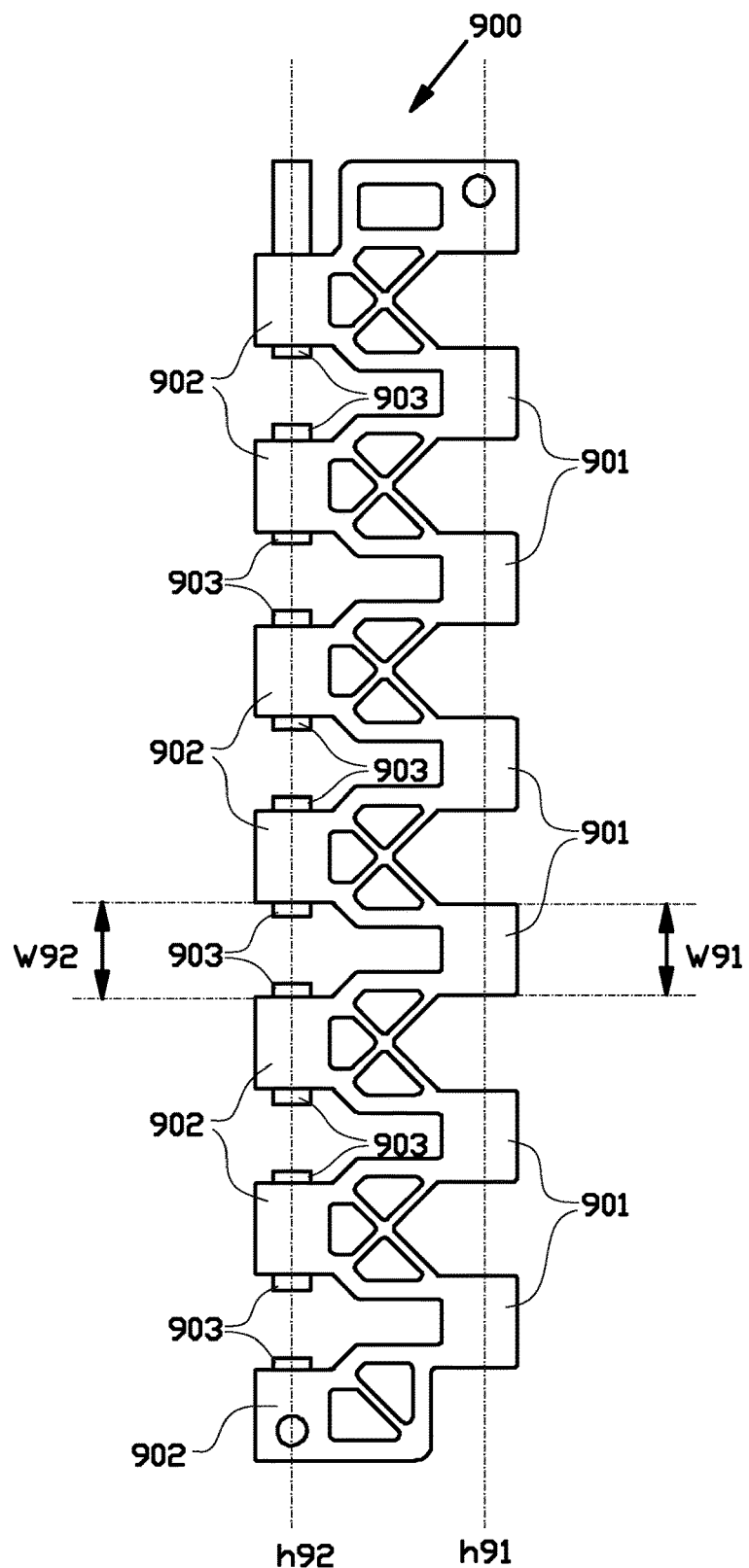
FIG. 10 schematically shows a support member of a conveyor belt according to a fourth example.

In an alternative embodiment of a support member 900 as shown in FIG. 10, each support member 900 comprises on a first side, a series of first parts 901 which are provided with through openings for accommodating the pins of an adjacent further support member. The through openings are arranged to substantially share the same centre line h91. In addition, each support member 900 comprises on a second side opposite to said first side, a series of second parts 902. However according to this fourth example, the series of pins 903 do not bridge the complete distance between two adjacent second parts 902. The pins 903 of two adjacent second parts 902 extend toward each other, but are arranged at a distance from each other. The pins 903 are arranged to substantially share the same centre line h92.

Figure 9:
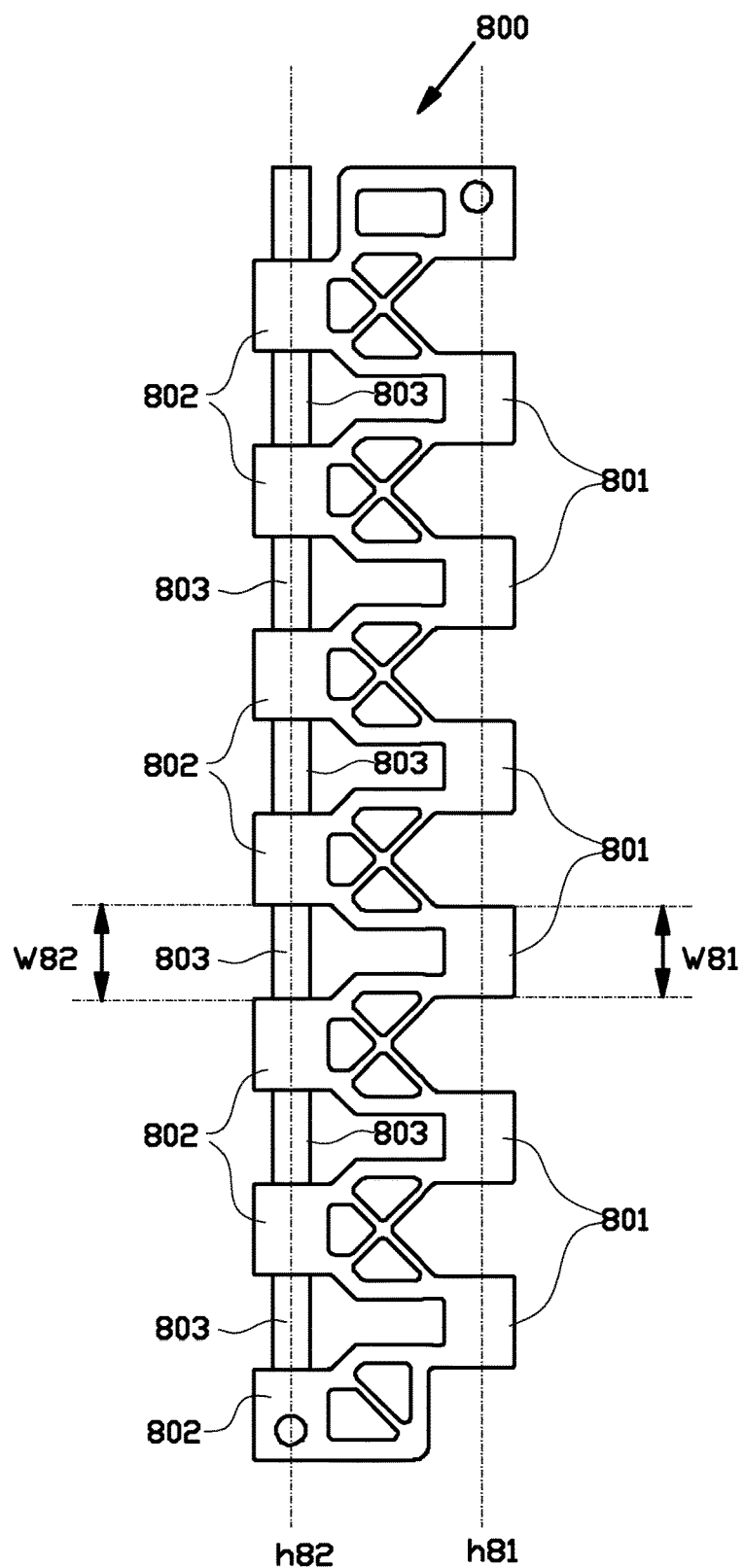
FIG. 9 schematically shows a support member of the example of FIG. 1.

As furthermore shown in FIGS. 8 and 9, the width w81, w91 of the first parts 801, 901 is substantially equal to the distance w82, w92 between two adjacent second parts 802, 902.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

For example, the conveyor belts of the examples are shown to be drivable in a transport direction T. However, the same conveyor belts can also be driven in a transport direction opposite to the direction T as shown in the enclosed figures.

In summary, the present invention relates to a conveyor belt comprising a series of linked elongated support members, which extend transverse to the conveyor belt and are arranged one behind the other in a longitudinal direction of the conveyor belt. Said conveyor belt comprises a first and a second support member, which are adjacent and partially inserted into each other. The first support member comprises a first part and a second support member comprises two second parts, wherein the first part is inserted between the two second parts. The first part comprises a through-opening that extends transverse to the conveyor belt. At least one of said second parts comprises a pin which extends transverse to the conveyor belt, and which is arranged in the through-opening. Said pin is integrally formed with the second support member. Preferably, said adjacent support members have been manufactured in a coupled state, preferably using a 3D printing process.

The invention claimed is:

1. A method for manufacturing a conveyor belt comprising
   a series of linked elongated support members, which provide a plane for supporting goods to be transported, which support members extend transverse to the conveyor belt and are arranged one behind the other in a longitudinal direction of the conveyor belt,
   wherein said conveyor belt comprises a first and a second support member, which are arranged adjacent to each other and which are partially inserted into each other,
   wherein the first support member comprises a first part,
   wherein the first part comprises a through-opening that extends transverse to the conveyor belt,
   wherein the second support member comprises two second parts,
   wherein at least one of said second parts comprises a pin which extends transverse to the conveyor belt,
   wherein said pin is integrally formed with the second support member,
   wherein the first part is inserted between the two second parts and the pin is arranged in the through-opening, and
   wherein the first and second support members are manufactured in a coupled state by means of an additive manufacturing process.

2. A method according to claim 1, wherein the additive manufacturing process comprises a 3D printing process.

3. A conveyor belt comprising a series of linked elongated support members, which provide a plane for supporting goods to be transported, which support members extend transverse to the conveyor belt and are arranged one behind the other in a longitudinal direction of the conveyor belt,
   wherein said conveyor belt comprises a first and a second support member, which are arranged adjacent to each other and which are partially inserted into each other,
   wherein the first support member comprises a first part, wherein the first part comprises a through-opening that extends transverse to the longitudinal direction of the conveyor belt,
   wherein the second support member comprises two second parts, wherein at least one of said second parts comprises a pin which extends transverse to the longitudinal direction of the conveyor belt, wherein said pin is integrally formed with the second support member, and
   wherein the first part is arranged between the two second parts, wherein the pin is arranged in the through-opening, and wherein the pin is enclosed by the first part of the first support member, wherein the pin is locked or retained in the first part of the first support member to provide a permanent coupling between the first support member and the second support member.

4. A conveyor belt according to claim 3, wherein the first and second support members have been manufactured in a coupled state.

5. A conveyor belt according to claim 3, wherein the pin is arranged to connect to said two second parts of the second one of said two adjacent support members, and to reach through the through-opening of the first one of said two adjacent support members.

6. A conveyor belt according to claim 5, wherein the pin is integrally formed with both second parts of the second support member.

7. A conveyor belt according to claim 3, wherein each of said second parts comprises a pin which extends transverse to the conveyor belt,
   wherein the pins are integrally formed with the second one of said two adjacent support members, and are arranged in the through-opening of the first one of said two adjacent support members.

8. A conveyor belt according to claim 7, wherein the pins are arranged at a distance from each other.

9. A conveyor belt according to claim 3, wherein the first and second support members are rigid, at least in a direction parallel to said plane for supporting goods to be transported.

10. A conveyor belt according to claim 3, wherein, at least in a direction transverse to the longitudinal direction of the conveyor belt, a width of the first part is equal to a distance between the two second parts.

11. A conveyor belt according to claim 3, wherein the through-openings in the first part comprises a slotted hole.

12. A conveyor belt according to claim 11, wherein the slotted hole provides a slot in a direction parallel to the direction of the conveyor belt.

13. A conveyor belt according to claim 3, wherein the first support member comprises at least two first parts which are arranged at a distance from each other in a directions transverse to the longitudinal direction of the conveyor,
   wherein each one of said first parts comprises a through-opening that extends transverse to the longitudinal direction of the conveyor belt,
   wherein the second support member comprises at least three second parts which are arranged at a distance from each other in the directions transverse to the longitudinal direction of the conveyor,
   wherein said second parts comprises at least two pins which extend transverse to the longitudinal direction of the conveyor belt, each one of said two pins is arranged to extend in a space between two second parts,
   wherein said pins are integrally formed with the second support member, and
   wherein each one of said first parts is arranged between the two second parts and each one of said pins is arranged in the through-opening of one of the first parts.

14. A conveyor belt according to claim 13, wherein the through-openings of said at least two first parts are arranged in line, and wherein the at least two pins are arranged in line.

15. A conveyor belt according to claim 3, wherein the pin comprises a circular cross section, at least in a direction transverse to the elongated support members.

16. A conveyor belt according to claim 3, wherein the through-opening and the pin comprises a rectangular cross section, at least in a direction transverse to the elongated support members.

17. A conveyor belt comprising a series of elongated support members for supporting goods to be transported, which support members extend transverse to the conveyor belt and are placed in series one behind the other in the direction of the conveyor belt,
   wherein two of said support members that are adjacent in the direction of the conveyor belt are at least partially inserted into each other, wherein parts of said two of said support members that are inserted into each other are provided with a through-opening that extends transverse to the conveyor belt, wherein the through-openings are placed in line for providing an accommodation space for a connecting rod for connecting the adjacent support members to each other, which accommodation space extends transverse to the conveyor belt, and wherein at least one of the through-openings and the connecting rod comprises a rectangular cross section, at least in a direction transverse to the elongated support members.

18. A belt conveyor system comprising at least two rotatable drums which are arranged at a distance from each other, and an endless loop of a conveyor belt according to claim 3, wherein the endless loop is arranged around said two rotatable drums.

19. A method of use of a conveyor belt according to claim 3, comprising transporting goods with the conveyor belt.

20. A conveyor belt according to claim 3, wherein the first and second support members have been manufactured in a coupled state by means of an additive manufacturing process or a 3D printing process.

* * * * *